May 11, 1943. R. D. CLEMSON 2,319,038
MOWER
Filed Feb. 25, 1939 6 Sheets-Sheet 1

INVENTOR
RICHARD D. CLEMSON
BY
ATTORNEYS

May 11, 1943.   R. D. CLEMSON   2,319,038
MOWER
Filed Feb. 25, 1939   6 Sheets-Sheet 6

INVENTOR
RICHARD D. CLEMSON
ATTORNEYS

Patented May 11, 1943

2,319,038

UNITED STATES PATENT OFFICE 2,319,038

MOWER

Richard D. Clemson, Middletown, N. Y., assignor to Clemson Bros., Inc., Middletown, N. Y., a corporation of New York Application February 25, 1939, Serial No. 258,362

13 Claims. (Cl. 56—249)

This invention relates to a mower and more particularly to a mower of the type having a rotary cutting reel.

One object of the invention is to provide a mower which will be lighter, simpler and more convenient to handle than those which are now in common use.

Another object of the invention is to design a mower which will be free from any tendency to "buck" or jump when operated either manually or by a tractor or a self-contained power unit at relatively high speed over minor irregularities of ground surface.

Another object of the invention is to provide a mower which will not cut into the turf or ground even when operated over rough ground.

Another object of the invention is to provide a mower which will cut at substantially uniform height above the ground even when the mower is operated over angular surfaces as, for example, across the edge of a terrace.

Another object of the invention is to provide a mower in which the reel is protected from injury by nails, sticks, stones or other obstructions becoming engaged between the fly-knives of the reel and the bed knife.

These and other objects of the invention, which will be evident from a reading of the following description in view of the accompanying drawings, I have attained by eliminating the ground roller, which trails behind the bed knife in the ordinary mower construction, and by designing the mower structure itself and especially its frame so that the bed knife may be temporarily raised from its normal position by direct contact with the ground, and advantageously also by the reel when an obstruction which cannot be cut is caught between the fly knife and the bed knife.

I am aware that prior to my invention it has been suggested to construct mowers without ground rollers, but in general these have lacked two functions for which the ground roller has been adopted, namely, the determination and adjustment of the height of the normal cut, i. e., the length of grass which is to be left after the cut, and secondly, the raising of the bed knife from its normal position when the mower is operated over a hummock or along a ridge as, for example, longitudinally along the edge of a terrace or at the border of a garden, etc. According to my present invention these functions are not abandoned, but on the contrary are served more effectively without the ground roller than in the ordinary construction using such a roller.

In the accompanying drawings and the following description I have shown and described a number of preferred embodiments of my invention and various modifications thereof and have suggested various alternatives. These are not intended to be exhaustive nor limiting of the invention but on the contrary are given for the purpose of illustrating the invention and instructing others in the principles thereof and the best manner of adapting the invention to practical use, in order that others may be enabled to modify it and apply it in numerous forms, each as may be best suited to the conditions and requirements of any particular use.

Referring first to Figs. 1 to 6 inclusive, the mower there shown is provided with wheels 20 carrying between them a cutter unit.

Figure 1:
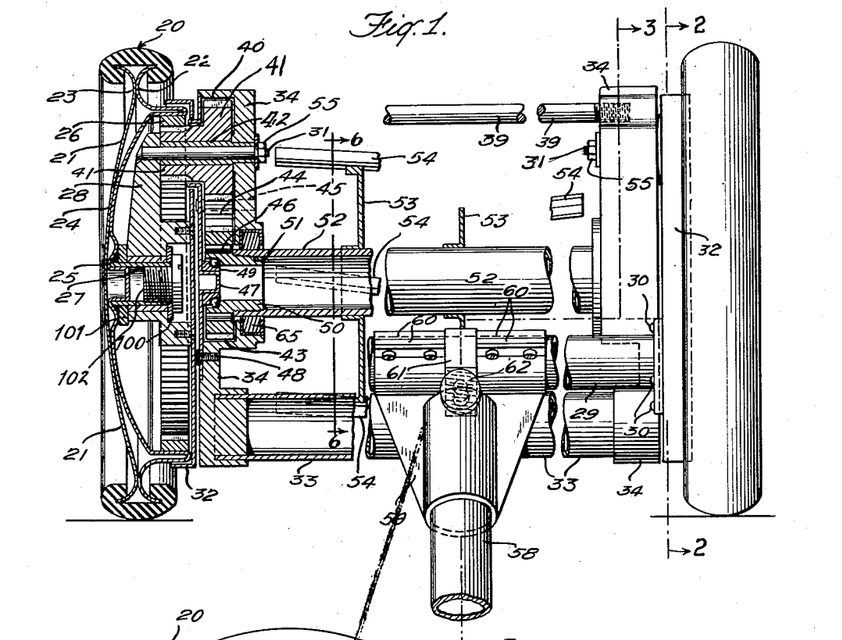
Fig. 1 is a plan view at one end and a sectional view partly on the horizontal plane indicated by the ends of the line 1—1 of Fig. 3 and partly through the several centers as indicated by the line 1—1; at the other end of a mower embodying my invention.
Figure 2:
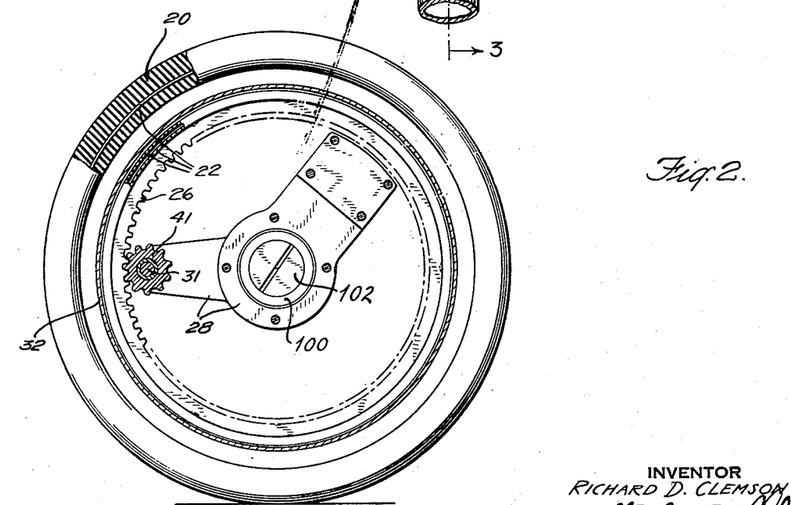
Fig. 2 is a view in vertical section taken on line 2—2 of Fig. 1.
Figure 3:
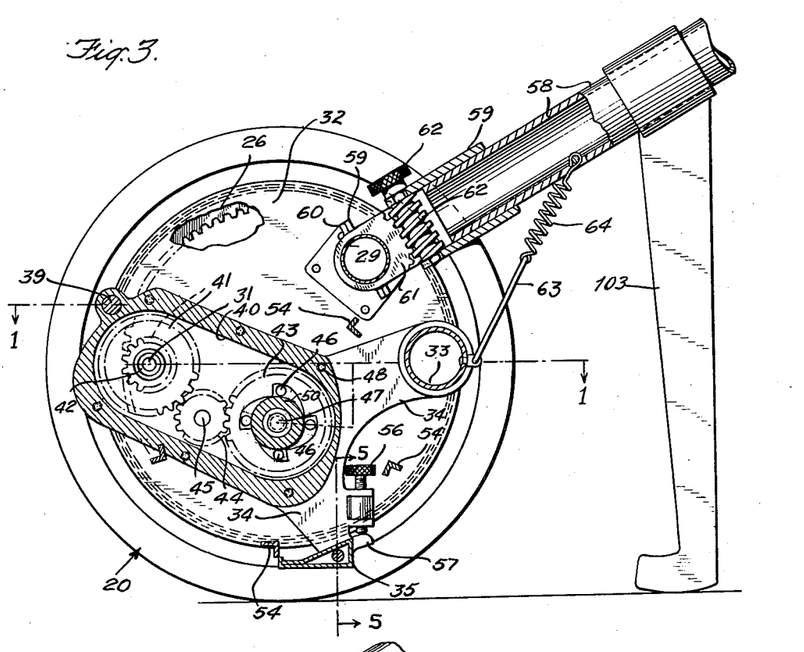
Fig. 3 is a view in elevation of the wheel assembly with the dust cover removed.

The wheels as shown in Figs. 1 and 3 are of a special construction. The two sheet metal stampings 21 and 22 are spot welded at 23, 24 and 25. A die-cast ring gear 26 is pressed into the inner stamping 22.

A tubular stud axle 27 is brazed or welded to the inner stamping 22 as shown, and this is mounted in the frame member 28 with thrust washers 100 and 101 at each end, the outer washers 101 being keyed to the axle 27, in a manner not shown, and held by a clamping bolt 102 as shown. One end of this member 28 is bolted to the cross bar 29 by the bolts 30, thus joining the members 28 of the opposite wheels and the bar 29 into a single primary frame unit. A stud 31 on the opposite end of the member 28 serves to connect the cutter unit into this primary frame. A dust cap 32 is secured to the frame member 28 by screws.

Figures 4, 5, 6:
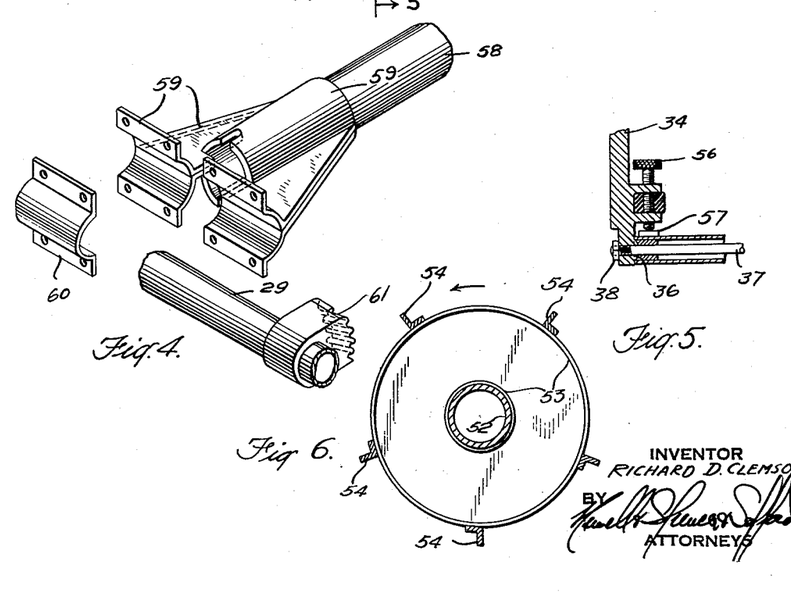
Fig. 4 is an expanded perspective view of the handle adjusting mechanism.
Fig. 5 is a fragmentary sectional view taken on line 5—5 of Fig. 3.
Fig. 6 is a sectional view through the reel taken on line 6—6 of Fig. 1.

The frame of the cutter unit comprises a tubular cross bar 33 and side frames 34 cast onto each end as clearly shown in Fig. 1. The bed knife 35 fitted to the side-frames 34 by a ball and socket joint 36 as shown in Fig. 5 is drawn tight by a clamping bolt 37 and lock nut 38, so that this assembly adds rigidity to the cutter unit. A third tie member, a bolt 39, is used in the present instance partly to give further rigidity and partly as a guard to protect shrubs, trees, etc., from the fly knives.

The side frames 34 are recessed at 40 to provide housings for the drive gears. The drive pinion 41 is mounted on the tubular axle 42 fixed in the frame 34 and drives the reel pinion 43 through the idler pinion 44 on the stud 45 cast into the frame 34. The pinion 43 drives the reel through the overrunning clutch rollers 46.

A spring dust cap 47 held by the clamp screws 48 serves both to close the housing and to provide a resilient self-adjusting bearing support for the reel. This spring cap 47 is accurately fitted on the stud 45 but has substantial clearance at the pinion 43 and the cap screws 48 so that it may be adjusted through a small arc concentric with the stud 45 to attain perfect alignment between bed knife and reel without affecting the accurate meshing of the gears. When the desired alignment is secured, the cap screws 48 are set down tight and hold the adjustment securely. Moreover, the cap 47 is dished enough so that when set down as just described it exerts a resilient pressure on the ball bearing cone 49, thus providing an automatic self-adjustment of that bearing which takes up wear and assures that there will be no play in normal use, although allowing a substantial yielding under excessive pressure, thus protecting the reel and bearing in case of shocks.

This mounting for the reel is more particularly described and claimed in my copending application, Serial No. 267,226, filed April 11, 1939.

The cup or ball race of the reel bearing, in the case illustrated, is formed as a separate member 50 of hardened alloy steel formed with a threaded portion 51 which cuts its own thread into the softer stock tubing 52 which constitutes the reel axle proper—the thread, of course, being right hand at one end and left at the other end of the axle so that it will be held tightened by the driving torque. The outside of the outer end of the member 50 is provided with a smooth cylindrical surface to cooperate with the rolls 46 and the pinion 43 to complete the overrunning clutch.

The reel proper is made of the sheet metal stamped spiders 53 fitted onto the tubular axle 52 and welded or brazed thereto and the L-shaped spiral forged blades 54 of the fly knives which are welded or brazed to the peripheries of the spiders 53. Since these blades are laid freely on the spiders and secured thereto by fusion, they are free from strain, regardless of manufacturing variations, and therefore are more resistant to impact and more accurate in their cutting relations in use; all as more fully described and claimed in my applications Serial No. 148,836, filed June 18, 1938, and Serial No. 267,225, filed April 11, 1939.

The felt dust washer 65 seals against dust and moisture the space within the housing 40.

Each wheel assembly is adapted to be removably mounted on the cutter unit by inserting or removing the stud 31 through the tubular axle 42, securing it in place by the nut 55, and then bolting the cross bar 29 at each end to the frame member 28. It is an advantage of my invention that the cutter unit may thus be assembled and adjusted at the factory, and if it should for any reason require repair, it may be removed and replaced as a unit.

In Fig. 5, I have shown the bed knife adjustment used. The ball and socket joint already described gives an assured axial position and a good frictional clamping. The manual screw 56 acts on the projection 57 at the rear of the bed knife to exert the desired force on the cutting edges.

The handle 58 is, in this case, made of tubular metal and is provided at its end with a clamp 59—60. A worm gear sector 61 is cast onto the cross bar 29, and a worm screw 62 engaged in the clamp 59 operates in this sector gear to determine the angular relation of the handle to the mower.

A chain 63 from the handle to the cross bar 33 determines the angular position of the cutter unit with relation to the primary frame and the handle and thus determines the height of cut. This chain includes a buffer spring 64 which yields to protect the chain against the momentum of the cutting unit when the unit is dropped back into position. The chain and the adjusting mechanism 61—62 are related so that with the handle in a given position of normal operation a turning of the screw 62 both lifts the cutter assembly through the chain 63, and rotates the entire mower below the handle by an amount just sufficient to bring the cutting edge of the bed knife back again to its proper position approximately vertically beneath the axis of the wheels. The farther out is the chain on this handle 58 the greater will be the lift for a given readjustment of bed knife position, so that a simple choice of the point of attachment of the chain, other factors being equal, will give this desired result.

A foot 103 may be provided to hold the handle in the operating position.

Various particular features of this construction are claimed in copending applications herein referred to. These are not essential to my present invention, which may be embodied in numerous other forms with or without these features, as illustrated by other examples shown in the drawings.

As shown in Fig. 3, the bed knife 35 is positioned so that its cutting edge is approximately beneath the axis of the wheels when the handle is in its mean operating position, and does not move substantially forward of the wheel axis while the mower is in operating position, i. e., not sufficiently ahead to noticeably affect the lengthening of the grass after cutting, with normal swinging of the handle during operation. This is an important feature of the invention in that it permits substantially accurate regulation of the height of cut irrespective of normal variations of the height of the handle due to irregularities in the ground over which the operator is walking or due to the different heights of different operators or differences in habits of holding the handle. Because the bed knife cutting edge is thus positioned with respect to the wheels, any angular change produces an arcuate movement of the bed knife edge which has a very large component in a forward or backward direction and a very small component in an upward or downward direction. With a handle length of about four feet from the wheel axis, a vertical movement of 18 inches in the height at which the handle is held, (which would be more than adequate to accommodate all normal variations in the handle position) would produce only about a 20° total angular movement about the wheel axis. Dividing this 10° on one side and 10° on the other side of the mid-position of the bed knife as shown, and assuming a wheel of ordinary diameter, this would result in only a very small fraction of an inch difference in the height of cut of the bed knife edge.

This arrangement is particularly important, as compared with ordinary lawn mowers, when the mower is used for cutting terraced lawns. An ordinary mower with a ground roller behind the bed knife cannot cut close into the angle between the horizontal and the sloping portion of the terrace, whereas any other type of mower having the bed knife offset would raise or lower the height of cut as the machine runs up or down the slope changing the angle at which the machine is operated.

If the machine shown in Fig. 1 should be operated longitudinally along the edge of a terrace or a raised walk or should be passed over a stone or hummock or if for any other reason the ground between the wheels should come to a higher level than the straight line connecting the bottoms of the wheels, then the bottom of the bed knife, being smooth as shown in the drawings, would skid along the ground and raise the bed knife reel assembly about the pivot 31 sufficiently to allow it to pass over the raised ground. It is advantageous that the cutting edge of the bed knife should be sufficiently above the bottom skidding surface so that, when this action occurs, the cutting will still be well above the ground and there will be no tendency for the fly knives to scuff off the turf or injure the crowns of the plants in the turf.

Another important feature of the construction shown in the drawings is the rigidity of the two pivoted assemblies. As a consequence of this the frame can swing as a unit and without distortion; and, whether it is struck by a rock at one end or skids over the ground near the middle or is operated upon by any other force, the efficient cutting of the assembly continues without danger of the fly knives clashing on the bed knife or being wrenched away from an efficient cutting contact.

Figure 7:
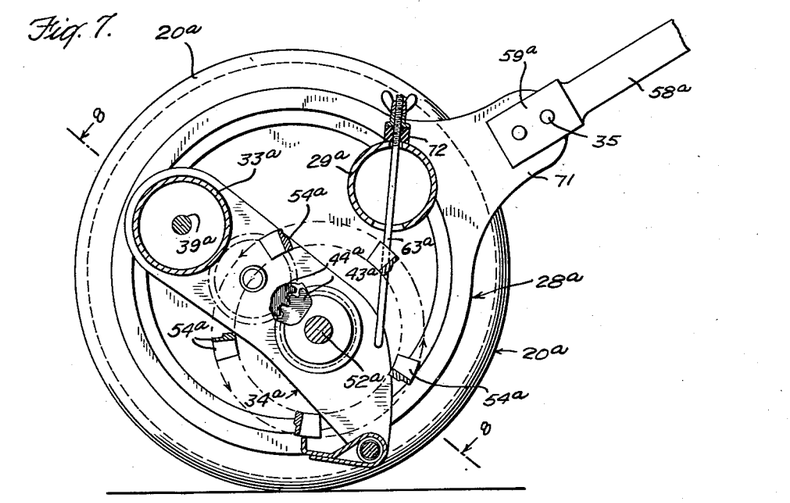
Fig. 7 is a view in vertical section, similar to that of Fig. 3, showing another embodiment of the invention.
Figure 8:
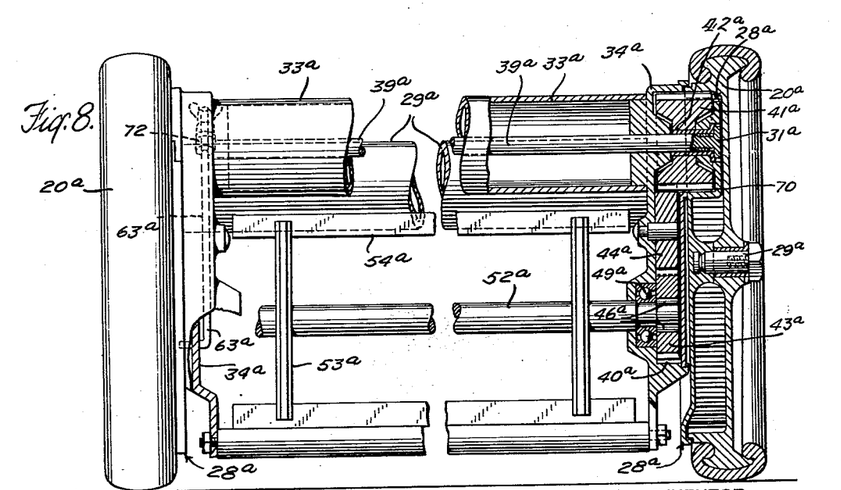
Fig. 8 is a view partly in elevation, looking in the direction of the arrows 8—8 of Fig. 7, and partly in section taken on line 8—8 of Fig. 7.

The device shown in Figs. 7 and 8 is similar in principle and operation but different in design and construction. In this case, the wheels 20a are mounted on stub axles 29a cast into the side frames 28a, which in this case serve also as dust caps for the wheels.

At the upper end of the frame 28a there is formed a recessed portion 70 in which the transmission gear 41a is mounted on the pivot bolt 39a. This bolt extends through a similar structure at the opposite side of the machine and serves to draw the tie bar 33a onto the secondary frames 34a. In order to provide for swinging movement between the frames 28a and the secondary frames 34a, a bearing sleeve 42a is fitted over the rod 39a with one end against the frame 34a, and its other end keyed in any manner, not shown, in a recess in the portion 70 of the side frame 28a. This sleeve 42a may also be keyed in any convenient manner, not shown, to the rod 39a to hold it against turning loose by friction of the secondary frame 34a in swinging thereon. The clamping bolt 31a acting on the secondary frame 34a through the sleeve 39a clamps the frame tightly onto the end of the tie-bar 33a, thus at once making a rigid connection between the tie bar 33a and the frame member 34a which forms a solid pivot for the transmission gear 41a and holding pivotally together the frame members 34a and 28a.

A recess or housing 40a within the swinging side frame 34a encloses the transmission gearing 41a, 44a and 43a.

The latter gear engages the reel shaft 52a through the over-running clutch 46a. The reel shaft is rotatably supported in the frame 34a by means of the ball-bearing 49a. The reel and the bed knife may be of standard construction or of the type described and claimed in my copending applications, Serial No. 148,836, filed June 18, 1937 and Serial No. 256,377 and 256,381 filed February 14, 1939.

On the rear upper portion of the frames 28a integral extensions 71 are fitted to the flattened end portions 59a of the tubular handle 58a. This may have a form and construction as shown in my copending applications, Serial No. 148,835, filed June 18, 1937, the design application No. D76,111, filed March 26, 1938, and Serial No. 256,379, filed February 14, 1939.

The side frames 28a on opposite sides of the mower are rigidly secured together by means of the tie bar 29a, the handle 58a and by the swinging frame assembly through the pivot rod 39a held by clamping bolts 31a. The connection of the tie bar 29a may be as described and claimed in my copending application, Serial No. 256,378, filed February 14, 1939.

Thus, the entire structure is rigid and under full control of the operator at all times.

The downward movement of the swinging assembly in this case is limited by means of the adjustable rod 63a inserted at one end through a hole in the secondary frame member 34a, and at the other end through holes in the tie bar 29a. A washer 72 of rubber or other resilient material serves at once as a buffer to absorb any shock when the swinging assembly drops into position and to protect the threads on the rod 63a if the adjustment should be such that these extend below the adjusting nut.

The operation and advantages of this structure are similar to those of Figs. 1 to 6 inclusive and will be evident from what has been said above in connection with those figures. In this case, however, due to the use of the ring gear and third pinion, any shock due to blocking of the reel will be absorbed by a lifting of the reel as already discussed above.

Figure 9:
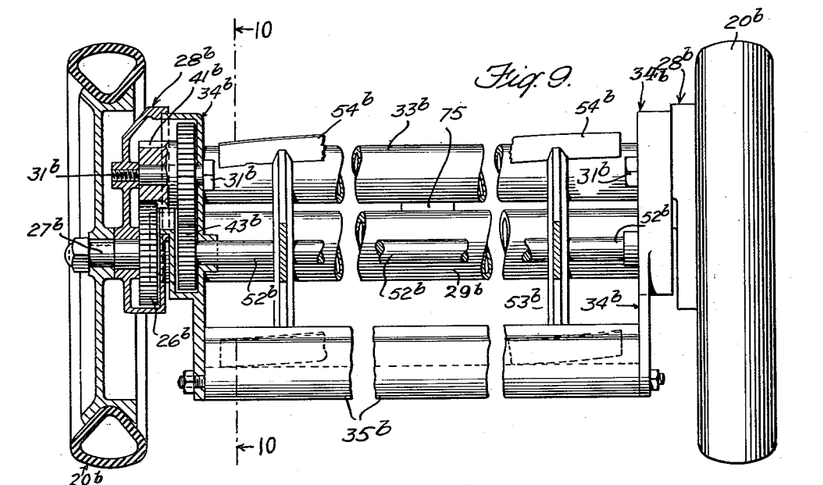
Fig. 9 is a view, partly in section, partly in elevation, taken on line 9—9 of Fig. 10, and showing another mower embodying my invention.
Figure 10:
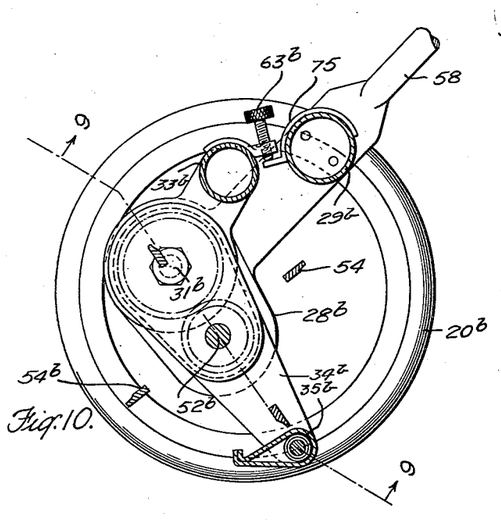
Fig. 10 is a view in section of the same mower taken on line 10—10 of Fig. 9.
Figure 11:
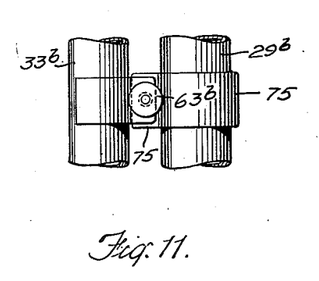
Fig. 11 is a fragmentary plan view of a center portion of the mower of Fig. 9.

In Figs. 9–11, I have shown a mower similar in structure and operation to that of Figs. 7 and 8, but in this case the drive is from a center wheel pinion 26b instead of from a ring gear as in the figures previously described.

The adjustment for height of cut in this case is by the screw 63b mounted on the cross bar 33b and striking the anvil member 75 on the cross bar 29b. Other parts are identified by the numbers of the corresponding parts of Figs. 1–8 but with the identifying letter "b."

A comparison of this structure with that of Figs 7 and 8 will show that there is advantage in arranging the gearing between the wheels 20 and the reel 52, e. g., as shown in Figs. 1–8, so that the lifting of the cutting assembly about the pivot 21 tends to slow down or reverse the drive rather than to speed it up. With such arrangement, the assembly may be lifted freely, since the reversal or slowing down automatically frees the over-running clutch in the reel assembly; whereas, the dropping back into place is cushioned by the inertia of the reel and the friction of its rotation on the bed knife as well as any resistance offered by materials being cut between the two. Upon return, the rotation of the reel pinion 43, due to its planetary movement about the gear 41, requires the reel to speed up its rotation.

It will be observed also that through this same gearing arrangement the reel and bed knife would be protected against injury due to the engagement of an object between them which cannot be cut. Under such circumstances the momentum of the reel may be absorbed in lifting the cutting assembly about the pivot 31; and, if the weight of the assembly and the moment of gravity thereon due to the positioning of the pivot 31 are kept sufficiently small, this swinging may be made to occur well before any permanent deformation of the blades; and thus the blades may be protected against impacts in operation, which are one of the most serious causes of unsatisfactory service of the lawn mowers known prior to my invention. In the case of Figs. 9 and 10 the gearing is such that, when the rotation of the reel is resisted, e. g., by a heavy stand of grass or an obstruction, the driving torque will tend to force the frame 34b downward; and, to the extent that this occurs at the same time that a high piece of ground requires the raising of the bed knife, these forces will be opposed.

The factors tending to lift the cutting unit at the proper times are this reaction to driving torque on the one hand and the direct "sledding" action of the ground as the bed knife strikes it and slides over it, and these are opposed by the weight of the cutter unit and, if desired, by supplemental spring pressure. The lifting effect of torque is determined first by the direction of rotation of the gear at the pivot 31 on which the frame 34 swings and secondly by the ratio of the radius of this gear to the moment arm of gravity or gravity plus spring load imposed on the cutter unit. The lifting component resulting from the sledding action depends upon the ratio of moment arms of the sliding surface of the bed knife and the center of gravity respectively from the pivot 31; but, since the force applied to the cutting unit by dragging over high ground has a vertical component, depending upon the smoothness and angle of the lower surface of the bed knife, as well as a horizontal component, the placing of the pivot 31 ahead of the wheel axis increases the lifting component of the drag on the bed knife. Placing the pivot 31b on the rear side of the gear 26b would reverse tendency of the driving torque to oppose the other lifting forces, but would also reverse the moment of the drag with respect to the pivot 31b and, therefore, would make the drag on the bed knife "toggle" the bed knife more tightly against the ground.

By suitable adjustment of these various factors, supported or opposed, if desired, by springs any desired condition can be attained.

With the type of adjustment for height of cut which is shown in these Figs. 7–10, it is desirable that the pivot 31 should be relatively low and far forward of the wheel pivot so as to give a relatively large component in a vertical direction and relatively little movement forward or backward from the position of vertical alignment with the wheel axis. In Figs. 1–6 and 15–16 this is not so important because the forward and backward component of adjustment is compensated for by the screw 61—62, or the guides 61d—62d.

Figures 12, 13, 14:
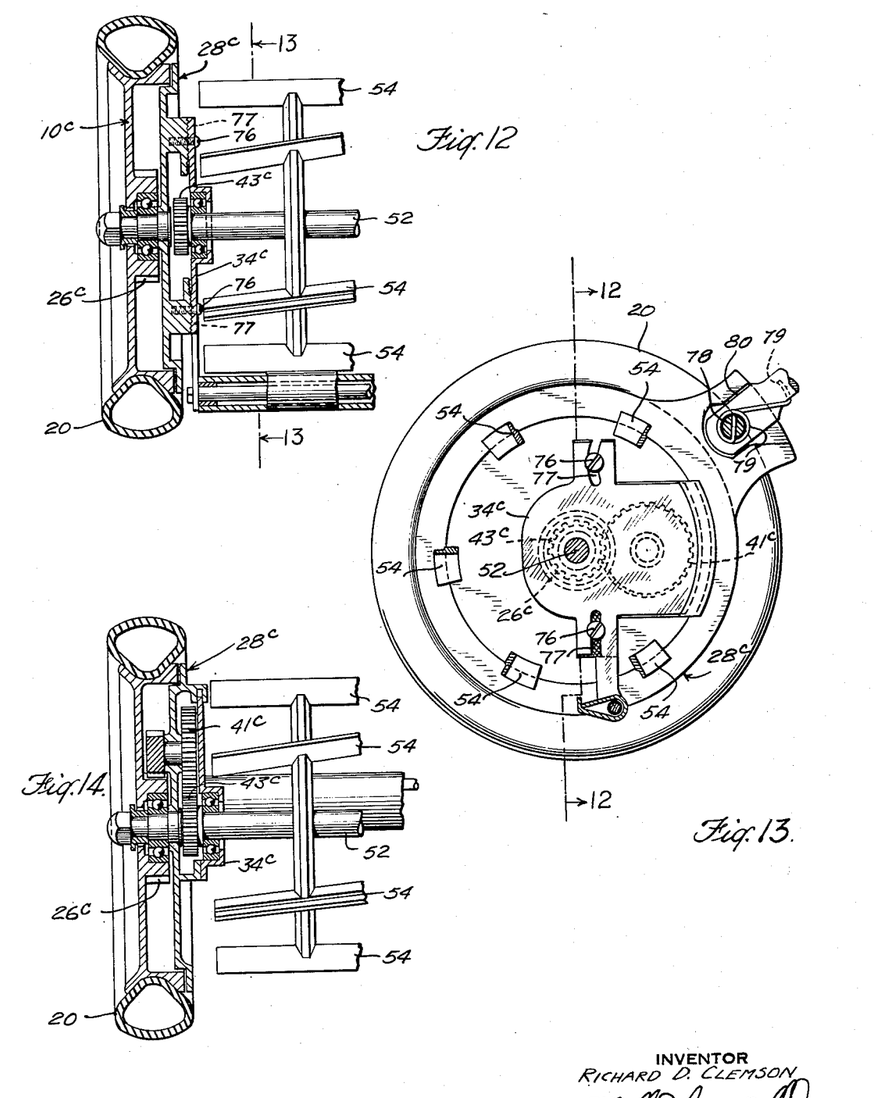
Fig. 12 is a vertical sectional view through one end of another modification.
Fig. 13 is a sectional view taken on line 13—13 of Fig. 12.
Fig. 14 is a view in horizontal axial section of the same embodiment as Figs. 12 and 13.

Figs. 12–14, I have shown a mower with simpler gearing and a different type of adjustment for height of cut and yielding when the bed knife strikes high ground between the wheels.

In this case the drive is from the wheel pinion 26c through the drive gear 41c to the reel pinion 43c. The housing side frames 34c in this case are not pivoted, but are rigidly adjustably secured to the combined frame and dust cap members 28c. This adjustment is by means of the screws 76 in the slots 77 in the frame members 34c. The engaging surfaces on the member 34c and the members 28c are advantageously grooved or otherwise roughened for more secure engagement; and the slots 77 are advantageously curved so that the adjusting movement of the reel follows the curvature of the gear 41c. Preferably this is achieved with greater curvature in the upper slot than in the lower so that, as the reel moves vertically the cutting edge of the bed knife remains in the vertical plane through the wheel axis.

The yielding to accommodate high ground between the wheels, is achieved in this case by the pivotal connection 78 of the handle 58c and the spring 79 which normally holds the handle in the angular position shown against the stop 80. Normally the handle is in an angular position just beyond dead-center so that force exerted along the handle tends to hold it against the stop 80; but when the reel is blocked against the bed knife or the bed knife drags on the ground the entire machine tends to rotate with the wheels. This breaks the handle joint at 78 and allows the bed knife to swing to a higher position. The spring 79, however, tends to return the cutting mechanism to its normal position, which will occur as soon as the obstruction is passed.

Figure 15:
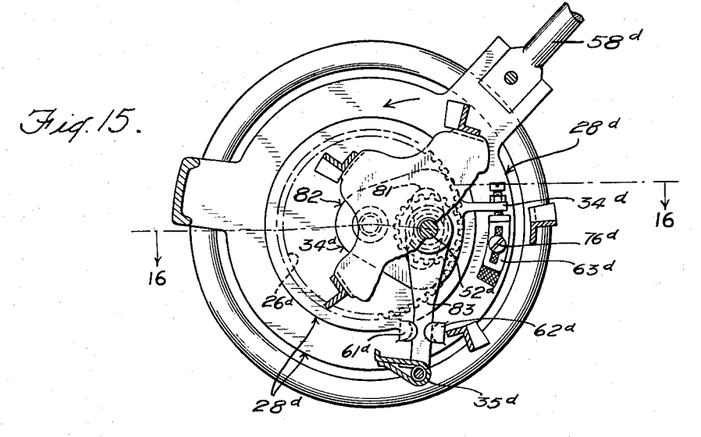
Fig. 15 is a vertical sectional view taken on line 15—15 of Fig. 16, showing another embodiment of the invention.
Figure 16:
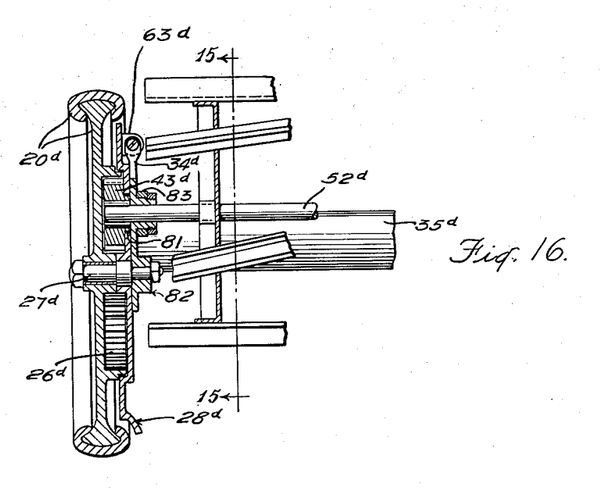
Fig. 16 is a view partly in plan, partly in horizontal section of the same mower.

In Figs. 15 and 16, I have shown another embodiment of my invention designed for simpler gearing. In this case the wheel 20d, ring gear 26d and side frames 28d may be substantially similar to those shown in other figures, except that in this case an arcuate slot 81 is provided in the side frame 28d for the reel shaft 52d; and the pinion 43d is in direct mesh with the ring gear 26d. The bed knife 35d and the reel 52d are mounted on a secondary swinging frame 34d which in the example shown comprises two parts pivotally connected to one another and to the bearing of the reel 52d. One of these parts 82 is pivotally mounted at its other end upon the inside of the wheel axle 27d; and the other part 83 carries at its lower end the bed knife 35d. The guides 61d—62d keep the bed knife in its vertical axial plane regardless of the height adjustment.

The adjusting stop 63d determines the position at which the secondary frame 34d is stopped, and thus determines the height of the cut; the adjustment is held by clamp screws 76d.

The yielding when the reel is blocked or when high ground is encountered is by the handle connection 78—79—80, as described in connection with Figs. 12 and 13.

In these various figures of the drawings I have shown the bed knife as a folded and welded strip of sheet metal 60 of suitable wear and corrosion-resisting alloy. This I have more particularly described and claimed in my copending application, Ser. No. 256,377, filed February 14, 1939. Obviously, other types of bed knives may be used.

Although there is advantage in having the secondary frame rigid in itself and adapted rigidly to maintain the operating relationships of its parts and to connect it to the primary frame in such a way as to avoid transmitting wrenching strains, all as shown, for example, in Figs. 1–6, that is a separate invention not essential to the invention claimed herein and which may be used with like advantages apart from the invention claimed herein.

Although I have shown in each of the examples illustrated a hand mower in which the handle 58 serves as the means for propelling the machine, it should be understood that my inventions are applicable to power mowers of the type having a motor mounted on the mower and driving the reel mechanism instead of the transmission drive from the wheels, or to power mowers of the type which are adapted to be connected by a tongue or other draft gear and drawn by a tractor or in fact by any suitable propelling means. I use this term "propelling means" broadly to include such tongue or other draft gear as well as handles.

Although I have shown the pivotal connection between the principal side frame members and the secondary swinging side frame members in only a few positions it will be understood that these can be varied through a wide range of positions. In general it is advantageous to have the pivot point vertically aligned with or ahead of the axis of the wheels. And although I have shown special designs of parts of these machines in combination with other specially designed parts, they may be used in other combinations with other parts.

Many other changes may likewise be made without departing from the scope of my invention.

What I claim is:

1. A lawn mower comprising, a cutter assembly including a rotary reel having cutter blades and a ledger blade having a base portion and an edge in shearing relationship with the cutting blades of the reel, a handle, wheels, means supported from the wheels for establishing an articulated connection between said cutter assembly and said handle along an axis at a right angle to the long axis of the handle, the ledger blade portion of said cutter assembly being movable about the point of articulation in a direction toward the long axis of said handle and means for limiting the movement of the ledger blade portion of said assembly away from the long axis of said handle, the base of said ledger blade lying substantially below the edge thereof and at all times constituting the lowest extremity of said assembly, whereby the ledger blade will be normally located in cutting position but upon the striking of an object by the base portion thereof will swing upwardly toward the handle to prevent damage.

2. A lawn mower comprising, a carriage frame member, wheels pivotally attached thereto, a handle member connected to said carriage frame member so that the position of the former will control the angular position of the latter, a cutter assembly including a rotary reel and a cooperating ledger blade mounted for operation as a unit, said cutter assembly being freely pivotally connected to said carriage frame at a point forward of the vertical diameters of the wheels and at least as high as their horizontal diameters when the handle is in normal operating position, the path of pivotal movement of the ledger blade of said cutter assembly intersecting the plane of the vertical diameters of said wheels near the bottom thereof and means for limiting the forward movement of the ledger blade of said cutter assembly approximately to said point of intersection, said limiting means being located intermediate the cutter assembly and one of said members.

3. A lawn mower comprising, a cutter assembly including a rotary reel having cutter blades and a bed knife having an edge in shearing relationship with the cutting blades of the reel, a handle, wheels, means supported from the wheels for establishing an articulated connection between said cutter assembly and said handle along an axis at a right angle to the long axis of the handle, the bed knife portion of said cutter assembly being movable about the point of articulation in a direction toward the long axis of said handle and means for limiting the movement of the bed knife portion of said assembly away from the long axis of said handle, said ledger blade having a blunt breast of substantial height located below its cutting edge and extending to a level substantially below the path of the reel, the bottom of said bed knife being sloped upwardly toward said breast, the lowest extremity of said bed knife at all times constituting the lowest extremity of said cutter assembly, whereby the ledger blade will be normally located in cutting position but upon the striking of an object by the bottom portion thereof will swing upwardly toward the handle to prevent damage.

4. A mower of the type which has wheels, a primary frame member on which said wheels are rotatably mounted, a handle member connected to said primary frame member, a secondary frame pivotally mounted on said primary frame member, a rotary cutting reel rotatably mounted on said secondary frame, means for driving said reel, a bed knife supported by said secondary frame in cutting relation to the reel, and stop means located between said secondary frame and one of said members limiting downward movement of the secondary frame, reel and bed knife to a position in which the bed knife edge is above the level of the bottoms of the wheels, when the mower is in normal operating position, by a distance equal to a predetermined height of cut, which is characterized by the means for driving the reel including a rotary torque transmission member on said primary frame member coaxial with the pivotal mounting of the secondary frame and engaging a rotary torque transmission member in the secondary frame with a rotational direction corresponding to the direction of swinging of the engaged member when the bed knife edge on the secondary frame is swung upward.

5. A mower of the type which has wheels, a primary frame member on which said wheels are rotatably mounted, a handle member connected to said primary frame member, a secondary frame pivotally mounted on said primary frame member, a rotary cutting reel rotatably mounted on said secondary frame, means for driving said reel, a bed knife supported by said secondary frame in cutting relation to the reel, and stop means extending between one of said members and said secondary frame to limit downward movement of the secondary frame reel and bed knife to a position in which the bed knife edge is above the level of the bottoms of the wheels when the mower is in normal operating position, by a distance equal to a predetermined height of cut, which is characterized by the pivotal connection between the primary frame and the secondary frame being positioned substantially forward of a vertical plane through the cutting edge of the bed knife above the edge thereof but within the space between the wheels, the distance of the pivotal connection above the cutting edge of the bed knife being greater than its distance forward of the vertical plane of the cutting edge thereof, and by the means for driving the reel including a rotary torque transmission member on said primary frame engaging a rotary torque transmission member in the secondary frame with a rotational direction corresponding to the direction of swinging of the engaged member when the bed knife on the secondary frame is swung upward.

6. A mower of the type which has wheels, a primary frame member on which said wheels are rotatably mounted, a handle member secured to said primary frame member in substantially predetermined angular relation, a substantially rigid secondary frame pivotally mounted on said primary frame, a rotary cutting reel rotatably mounted on said secondary frame, a bed knife mounted on said secondary frame in cutting relation to the reel, which is characterized by the pivotal connection between the primary frame and the secondary frame being positioned substantially forward of a vertical plane through the cutting edge of the bed knife and a greater distance above the level of said cutting edge and yet within the space between the wheels, by torque transmission means for driving the reel from the wheels including a rotary member rotatably mounted on the primary frame coaxial with the pivotal mounting of the secondary frame thereon and a second rotary member engaged by the first, said second rotary member being rotatably mounted on the secondary frame with a rotational direction, where it engages said first-named member, corresponding to the direction of swinging of the engaged member when the secondary frame is swung upward, whereby the driving torque tends to lift the secondary frame when the rotation of the reel is blocked, by the bed knife having a blunt breast of substantial height and its bottom being at a lower level behind said breast, and having its cutting edge at least as far forward as the lowest point of the path of rotation of the reel, and by means connecting said secondary frame and one of said members for limiting the downward swinging of the secondary frame.

7. A mower of the type which comprises, wheels, through which the mower normally has its entire contact with and support from the ground, side frames on which said wheels are rotatably mounted, a secondary frame, means pivotally connecting said secondary frame to said side frames for free swinging movement therebetween, a cutting reel, means for mounting said cutting reel on said secondary frame for rotation therein, a bed knife, means mounting said bed knife on said secondary frame in cutting relation with the reel, and mower propelling means connected to said side frames, which mower is characterized by an adjustable stop extending between a portion thereof rigid with said side frames and a portion of said secondary frame, said stop functioning to limit the amplitude of forward pivotal movement of the secondary frame at a position which, in the operating position of the mower, holds the bed knife at a height above the bottom of the wheels equal to a predetermined height of cut, and an angularly adjustable fixed connection between the propelling means and the side frames.

8. A mower of the type which comprises wheels, a rotary cutting reel, a bed knife, a handle, side frames, means connecting the wheels to the side frames for rotation, a secondary frame, said reel and bed knife being secured to said secondary frame in mutually operative relation, and means pivotally connecting said secondary frame to said side frames whereby the cutting reel and bed knife are rendered freely movable as a unit relative to the side frames without disturbing their operative relation, which mower is characterized by angularly adjustable means for connecting the side frames and the handle and for holding them in adjusted angular relation, and means connecting said handle and said secondary frame adapted to adjust the limit of forward swinging of the secondary frame, said adjusting means being related to one another so that at any given height of the bed knife established by adjustment, the angular position of the side frames will be adjusted so as to bring the axis of the wheels approximately vertically above the cutting edge of the bed knife.

9. A mower of the type which comprises wheels, a rotary cutting reel, a bed knife, a handle, side frames, means connecting the wheels to side frames for rotation, a secondary frame, said reel and bed knife being secured to said secondary frame in mutually operative relation, and means pivotally connecting said secondary frame to said side frames whereby the cutting reel and the bed knife are rendered freely movable as a unit relative to the side frames without disturbing their operative relation, which mower is characterized by an adjustable stop for limiting the forward swinging of the secondary frame and bed knife carried thereby, said stop interconnecting to the handle and secondary frame, and angularly adjustable means connecting said handle and the side frames, the lever length of the point at which said stop is attached to said secondary frame being such that the horizontal component of the swinging of the bed knife by the raising of said stop when the angle of the propelling means is adjusted is substantially compensated for by an opposite lateral component of the rotation of the side frames as a result of said adjustment.

10. A mower of the type which has wheels, a primary frame on which said wheels are rotatably mounted, propelling means connected to said primary frame, a secondary frame pivotally mounted on said primary frame, a rotary cutting reel rotatably mounted on said secondary frame, means for driving said reel including interengaging rotary torque transmission members, a bed knife held by said secondary frame in cutting relation to the reel, and stop means limiting downward movement of the secondary frame reel and bed knife to a position in which the bed knife edge is above the level of the bottoms of the wheels, when the mower is in normal operation position, by a distance equal to a predetermined height of cut, which is characterized by the means for driving the reel including a rotary torque transmission member on said primary frame engaging a rotary torque transmission member on the secondary frame with a rotational direction corresponding to the direction of swinging of the engaged member when the secondary frame is swung upward, and by an overrunning clutch in said drive means.

11. A mower of the type which comprises wheels through which the mower normally has its entire contact with and support from the ground, a carriage frame on which said wheels are rotatably mounted, a cutter frame connected to the carriage frame, a rotary cutting reel rotatably mounted on said cutter frame, a bed knife held by said cutter frame in cutting relation to the reel and propelling means connected to said carriage frame, which mower is characterized by the reel being coaxial with the wheels, the propelling means being pivotally adjustable on the carriage frame, and a stop limiting the pivotal movement of the propelling means relative to the carriage frame at normal cutting position in which the bed knife is approximately vertically beneath the axis of the wheels, while allowing pivotal movement of the propelling means relative to the carriage frame between said stop and a position in which the bed knife is behind and above its normal cutting position, and means to urge cutter frame into the former position with the bed knife edge beneath the wheel axis.

12. A mower comprising wheels including drive gearing, a primary frame, means pivotally connecting said wheels to said primary frame, a handle, means connecting said handle to said primary frame, a secondary frame including a rotary cutting reel, drive gearing therefor and a bed knife, transmission gearing supported in said primary frames connecting the drive gearing of said wheels with that of said cutting reel, means connecting said secondary frame to said primary frame for relative adjustment, and means for maintaining the adjustment of said connecting means including means for guiding the bed knife portion of said secondary frame in a vertical path and means for guiding the gearing portion of said secondary frame in an arcuate path whereby the height of the bed knife is rendered vertically adjustable while the gearing for the reel is maintained in mesh with the transmission gearing of said secondary frame.

13. A mower of the type which comprises wheels through which the mower normally has its entire contact with and support from the ground, a carriage frame on which said wheels are rotatably mounted, a cutter frame pivotally connected to the carriage frame, a rotary cutting reel rotatably mounted on said cutter frame, a bed knife held by said cutter frame in cutting relation to the reel and propelling means connected to said carriage frame, which is characterized by the carriage frame being fixed on the propelling means, the reel and the cutter frame being movable on said fixed portion so as to lift the bed knife, and parallel guides on said carriage frame restricting said lifting movement of the bed knife and cutter frame to a predetermined upward path and a stop limiting downward movement along said path.

RICHARD D. CLEMSON.